July 5, 1949.　　　　　H. L. GORDON　　　　　2,475,493
ANTIFRICTION BALL BEARING
Filed April 15, 1947
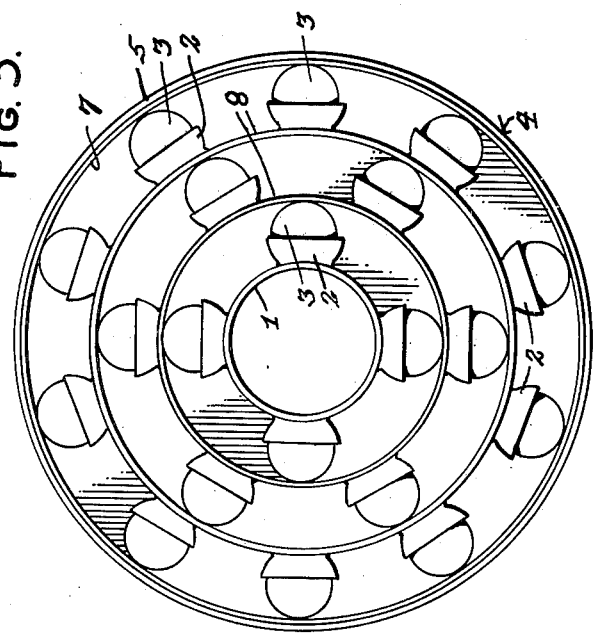
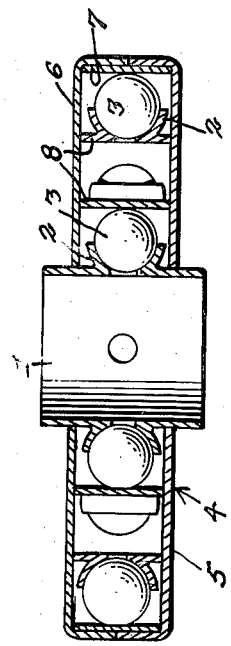
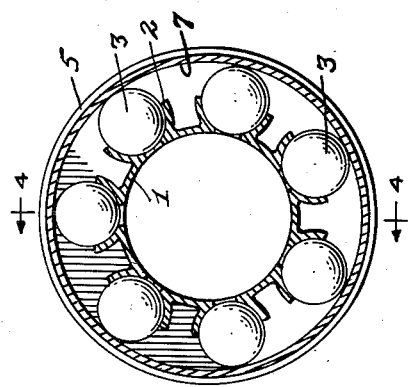
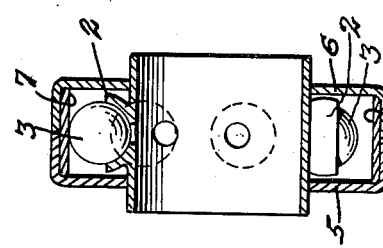
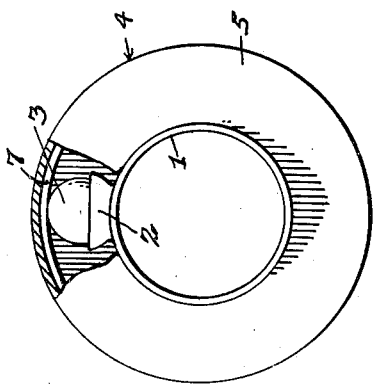
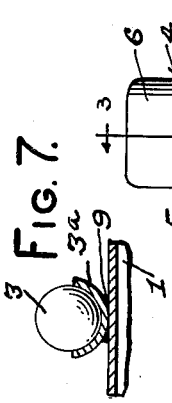
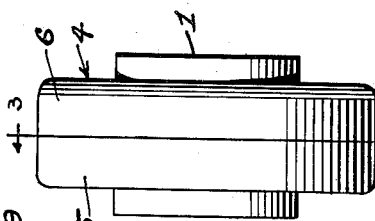
Inventor,
HARRY L. GORDON,
By E. E. Vrooman & Co,
Attorneys.

Patented July 5, 1949

2,475,493

UNITED STATES PATENT OFFICE 2,475,493

ANTIFRICTION BALL BEARING

Harry L. Gordon, Elmhurst, N. Y.

Application April 15, 1947, Serial No. 741,564

4 Claims. (Cl. 308—188)

This invention relates to an antifriction ball bearing.

An object of the invention is the production of a unitary device which is comparatively inexpensive to construct, and is highly efficient in operation.

Another object of the invention is the construction of an antifriction ball bearing device that can be used in connection with shafts, particularly airplane shafts, and which device is susceptible of repair with comparative ease when any part thereof is worn or needs repairing.

A still further object of the invention is the construction of a novel device in which small ball bearings can be employed for quieter operation, and which ball bearings can be placed easily in position, or removed when worn with equal ease.

With the foregoing and other objects in view, my invention comprises certain novel constructions, combinations, and arrangements of parts as will be hereinafter fully described, illustrated in the accompanying drawings, and more particulary pointed out in the appended claims.

In the drawings:

Fig. 1 is a view in side elevation of a device constructed in accordance with this invention, part of the casing being broken away.

Fig. 2 is a view in end elevation.

Fig. 3 is a vertical sectional view taken on line 3—3, Fig. 2, and looking in the direction of the arrow.

Fig. 4 is a vertical sectional view taken on line 4—4, Fig. 3, and looking in the direction of the arrows.

Fig. 5 is a view in elevation of another embodiment of the invention, showing the auxiliary section of the casing removed.

Fig. 6 is a transverse sectional view of the device illustrated in Fig. 5.

Fig. 7 is a fragmentary sectional view of another embodiment of the invention.

Referring to Figs. 1 to 4 of the drawings, in which the preferred embodiment of this invention is illustrated, I comprises an annular shaft section which is provided on its periphery with a plurality of cups 2. In each cup 2 is a ball bearing 3. A casing 4 is mounted upon the annular shaft section I and encloses the cups 2 and ball bearings 3. The casing 4 comprises a primary section 5 and an auxiliary section 6. Within the casing 4 is a retaining ring 7. This ring is flat in cross-section, and is of the same width as the inside of the casing 4. The ball bearings 3 travel over the inner face of the retaining ring 7. This retaining ring 7 performs a dual function in that it constitutes a track over which the ball bearing 3 travels, as well as a holding means for ball bearings 3 while the device is being assembled. The constructor places the primary section 5 on the annular shaft section I, then he places the retaining ring 7 in position within said primary section 5, and then places the ball bearings 3 down in cups 2, the retaining ring 7 keeping the ball bearing 3 from jumping out of place, or being displaced from cups 2. In other words, the retaining ring 7 is much wider than the width of the primary section 5, constituting a good guide for inserting the ball bearing 3 in said cups. Then the auxiliary section 6 is placed in position upon the annular shaft section I, against the primary section 5. The two sections 5 and 6 of the casing 4 can be held together after assembled by any ordinary method or means.

During the assembling of the parts, the cups 2 keep the sections of the casing 4 from moving off the annular shaft section I. Therefore, the cups perform the dual function of seating the ball bearings 3, as well as acting as a stop, preventing displacement of the sections off the annular shaft section I. The novel retaining ring 7, as indicated hereinbefore, performs the dual function of the track for the ball bearings and a deep or wide guide while placing the ball bearings 3 in position.

In the embodiment shown in Fig. 5, the construction of the annular shaft section I and the sectional casing 4 is the same as described for the preferred embodiment shown in Figs. 1 to 4. There are a plurality of rings 8 in this embodiment, arranged in nesting position within the casing 4. Each ring 8 is provided with a plurality of cups 2 in each of which is placed a ball bearing 3. In this structure the smaller ball bearing 3 may be employed, resulting in quieter operation. The rings 8 perform the dual function of supporting the cups 2 and acting as the tracks for the two inner sets of ball races.

In the embodiment shown in Fig. 7, the cup 3a is not made an integral part of the annular shaft section I, but is attached thereto by welding or soldering at 9. This same type of cup 3a can be used in constructing the cups and rings shown in Figs. 5 and 6.

The annular shaft section I can be fixedly secured to any shaft, in any ordinary manner.

While I have described the preferred embodiments of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a device of the class described, the combination of an annular shaft section, said annular shaft section provided with cups, ball bearings seated in said cups, a sectional casing over said ball bearings and contacting said annular shaft section, a retaining ring within said sectional casing and being of greater width than any one section of said casing, and said retaining ring being in engagement with said ball bearings.

2. In a device of the class described, the combination of an annular shaft casing, said annular shaft casing provided with a plurality of cups on its periphery, a ball bearing seated in each cup, a sectional casing over said ball bearings and seated on said annular shaft section, said sectional casing comprising a primary and an auxiliary section, a retaining ring removably mounted in said sectional casing, said retaining ring being flat in cross-section and being of greater width than either of said primary and auxiliary sections, and said ball bearings engaging the retaining ring.

3. In a device of the class described, the combination of an annular shaft section, said annular shaft section provided with a plurality of cups, ball bearings seated within said cups, a plurality of flat rings around said first-mentioned ball bearings, each ring provided with ball-containing cups, a removable ring around the outer set of ball bearings, and a sectional casing around said last-mentioned ring and seated on said annular shaft section.

4. In a device of the class described, the combination of an annular shaft section provided with ball-bearing holding cups, a sectional casing on said annular shaft section, and a ring within said sectional casing and wider than any one section of said casing and surrounding said ball bearings.

HARRY L. GORDON.

REFERENCES CITED

The following references are of record in the file of this patent:

UNITED STATES PATENTS

| Number | Name | Date |
|---|---|---|
| 1,494,695 | McCluskey | May 20, 1924 |

FOREIGN PATENTS

| Number | Country | Date |
|---|---|---|
| 18,769 | Great Britain | 1894 |
| 501,193 | France | Apr. 6, 1920 |